| United States Patent [19] | [11] Patent Number: 4,650,719 |
| Dien et al. | [45] Date of Patent: Mar. 17, 1987 |

[54] STORAGE-STABLE THERMOSETTING COMPOSITIONS COMPRISING AN IMIDO/ORGANOSILICON PREPOLYMER

[75] Inventors: Rene Dien, Millery; Guy Poulain, Gournay sur Marne, both of France

[73] Assignee: Rhone-Poulenc Specialites Chimiques, Courbevoie, France

[21] Appl. No.: 791,615

[22] Filed: Oct. 25, 1985

[30] Foreign Application Priority Data

Feb. 8, 1985 [FR] France .................................. 85 02008

[51] Int. Cl.$^4$ .............................................. B32B 27/00
[52] U.S. Cl. .................................. 428/422.8; 428/447; 428/473.5; 528/26; 528/27; 528/28; 528/21
[58] Field of Search ...................... 528/26, 27, 28, 21; 428/447, 422.8, 473.5

[56] References Cited

U.S. PATENT DOCUMENTS 4,544,728  10/1985  Dien et al. ............................ 528/28

Primary Examiner—Melvyn I. Marquis
Attorney, Agent, or Firm—Burns, Doane, Swecker & Mathis

[57] ABSTRACT

Storage-stable, adhesive, flexible and mechanically improved thermosetting film-forming compositions are comprised of (A) an imido-hydroxylated organosilicon prepolymer, (B) triallyl isocyanurate or an acrylic ester of a diphenylated siloxane, (C) an imidazole, and (D) an N,N',N"-tris(hydroxyalkyl)hexahydrotriazine.

19 Claims, No Drawings

STORAGE-STABLE THERMOSETTING COMPOSITIONS COMPRISING AN IMIDO/ORGANOSILICON PREPOLYMER

BACKGROUND OF THE INVENTION

1. Field of the Invention

The present invention relates to hardenable compositions based on prepolymers containing both imide and siloxane groups and various adjuvants, and, more especially, to thermosetting such compositions which are storage-stable, film-forming at temperatures of from 40° to 90° C., adhesive at ambient temperature and also flexible.

2. Description of the Prior Art

A wide variety of thermosetting compositions, each having various advantages and disadvantages, are known to this art.

Thermosetting compositions prepared from bismaleimides and hydroxylated silanes, for example, are described in French Pat. No. 2,460,308. These compositions do not have sufficient flexibility for certain intended applications. Furthermore, they display no adhesiveness in thin layer form.

Published French Patent Application No. 83/17,218 describes storage-stable compositions which are film-forming at temperatures of from 40° to 90° C. and preferably from 60° to 80° C., adhesive at ambient temperature and also flexible.

As utilized herein, by a "storage-stable" composition there is intended a composition which remains homogeneous (absence of crystallization of a constituent) and which does not change with time.

Also as utilized herein, by a "film-forming" composition there is intended a composition which is fluid at from 40° to 90° C. and may be deposited by spreading, or another conventional coating technique, onto a textile or a non-woven fabric, a fiber mat or a transfer paper, the fibers forming these various substrates being covered continuously, either directly or after transfer.

And by a composition which is "adhesive" at ambient temperature there is intended a composition which, when deposited onto a substrate and its temperature returned to ambient, the substrate can be positioned by mere pressure and will remain adhered in any position.

By a "flexible" composition there is intended a composition which, when deposited onto a substrate, does not increase the stiffness of the said substrate, enabling the latter to match the shapes of the parts to be produced therefrom which may be, for example, paths of revolution incorporating convex and concave sections and having rounded portions and/or ridges.

The aforenoted French Patent Application No. 83/17,218 more particularly relates to thermosetting compositions consisting essentially of:

(A) a prepolymer obtained by interreacting, at a temperature of from 50° C. to 300° C.:

(a) a bisimide or a combination of several bisimides, or a combination of a bisimide and N-cyclohexylmaleimide, said bisimide(s) being selected from among those of formula (1):

$$\begin{array}{c} YC-CO \\ \parallel \\ YC-CO \end{array} \!\!\!\! \diagup\!\!\!\!\diagdown N-L-N \diagup\!\!\!\!\diagdown \!\!\!\! \begin{array}{c} CO-CY \\ \parallel \\ CO-CY \end{array} \qquad (1)$$

wherein Y denotes H or CH$_3$ and the symbol L denotes a divalent radical selected from among cyclohexylene, phenylene, 4-methyl-1,3-phenylene, 2-methyl-1,3-phenylene, 5-methyl-1,3-phenylene, 2,5-diethyl-3-methyl-1,4-phenylene radicals, and radicals of the formula:

$$\phantom{xxx} (2)$$

(diphenyl-T structure with X substituents)

in which T denotes a group:

$$-CH_2-,\ -\underset{\underset{CH_3}{|}}{\overset{\overset{CH_3}{|}}{C}}-,\ -O-,\ -\underset{\underset{O}{\parallel}}{\overset{\overset{O}{\parallel}}{S}}-,\ H-\underset{|}{\overset{|}{C}}-\!\!\!\diagdown\!\!\!\!\diagup,\quad (3)$$

$$\bigwedge\!\!\!\!\bigvee\ \text{or}$$

$$-O-\!\!\!\diagdown\!\!\!\!\diagup-SO_2-\!\!\!\diagdown\!\!\!\!\diagup-O-$$

and X denotes a hydrogen atom, a methyl, ethyl or isopropyl radical;

(b) an organosilicon compound incorporating, per molecule, at least one hydroxyl group bonded to a silicon atom;

(B) a triallyl isocyanurate or an acrylic ester of a diphenylated siloxane compound having the general formula (4):

$$\underset{R}{\overset{H \text{ or } CH_3}{\underset{|}{C}}}\!\!-\!\!COO-CH_2-CH_2-O-\underset{\text{(diphenyl)}}{\overset{}{Si}}-O-CH_2-CH_2-OOC-\underset{R}{\overset{CH_3 \text{ or } H}{\underset{|}{C}}} \quad (4)$$

wherein R is a hydrogen atom or a methyl or ethyl radical; and (C) an imidazole compound.

Certain compositions have now been found, the properties of which are even more improved vis-a-vis those compositions described in said French Patent Application No. 83/17,218.

SUMMARY OF THE INVENTION

Briefly, the present invention features novel thermosetting compositions of matter characterized in that they essentially consist of:

(A) a prepolymer prepared by interreacting, at a temperature of from 50° C. to 300° C.:

(a) a bisimide or a combination of several bisimides, or a combination of a bisimide and monomaleimide, said bisimide(s) being selected from among those of formula (1):

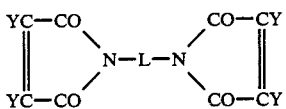

wherein Y denotes H or CH₃ and the symbol L denotes a divalent radical selected from among cyclohexylene, phenylene, 4-methyl-1,3-phenylene, 2-methyl-1,3-phenylene, 5-methyl-1,3-phenylene, 2,5-diethyl-3-methyl-1,4-phenylene radicals, and radicals of the formula (2):

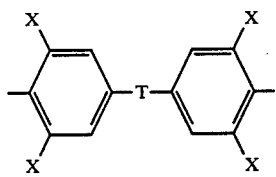

in which T denotes a single valency bond or a group:

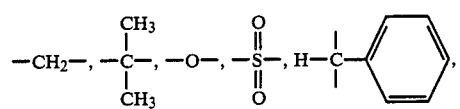

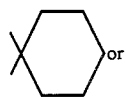

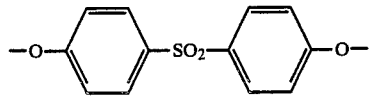

and X denotes a hydrogen atom or a methyl, ethyl or isopropyl radical;

(b) an organosilicon compound incorporating, per molecule, at least one hydroxyl group bonded to a silicon atom;

(B) a triallyl isocyanurate or an acrylic ester of a diphenylated siloxane compound having the general formula (4):

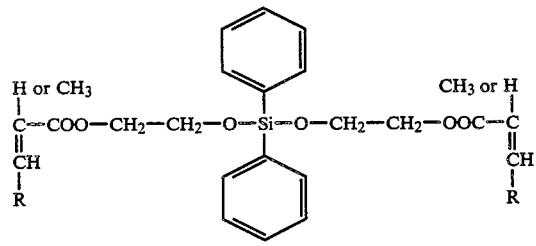

wherein R is hydrogen, or a methyl or ethyl radical;

(C) an imidazole compound; and (D) a N,N',N''-tris(hydroxyalkyl)hexahydrotriazine.

DETAILED DESCRIPTION OF THE INVENTION

More particularly according to the present invention, representative bismaleimides having the formula (1) include:

(1) N,N'-meta-phenylene bismaleimide,
(2) N,N'-para-phenylene bismaleimide,
(3) N,N'-4,4'-diphenylmethane bismaleimide,
(4) N,N'-4,4'-diphenyl ether bismaleimide,
(5) N,N'-4,4'-diphenyl sulfone bismaleimide,
(6) N,N'-1,4-cyclohexylene bismaleimide,
(7) N,N'-4,4'-(1,1-diphenylcyclohexylidene)bismaleimide,
(8) N,N'-4,4'-(2,2-diphenylpropane)bismaleimide,
(9) N,N'-4,4'-triphenylmethane bismaleimide, and
(10) N,N'-6-methyl-1,3-phenylene bismaleimide.

These bismaleimides may be prepared, for example, by the processes described in U.S. Pat. No. 3,018,290 and British Pat. No. 1,137,290.

When a monomaleimide is combined with the bismaleimide having the formula (1), the number of maleimide functions introduced by the monomaleimide does not constitute more than 30% of the total number of maleimide functions involved in the reaction.

As specific examples of the monomaleimides which can be employed in the compositions according to the present invention, representative are: N-phenylmaleimide, N-cyclohexylmaleimide, N-phenylmethylmaleimide, N-(4-methylphenyl)maleimide, N-(4-nitrophenyl)maleimide, N-(4-phenoxyphenyl)maleimide, N-(4-phenylaminophenyl)maleimide, N-(4-phenoxycarbonylphenyl)maleimide, 1-maleimido-4-acetoxysuccinimidobenzene, 4-maleimido-4'-acetoxysuccinimidodiphenylmethane, 4-maleimido-4'-acetoxysuccinimidodiphenyl ether, 4-maleimido-4'-acetamidodiphenyl ether, 4-maleimido-4'-acetamidodiphenylmethane and N-(4-phenylcarbonylphenyl)maleimide.

These monomaleimides may be prepared, for example, by process described in U.S. Pat. No. 2,444,536 for the preparation of N-arylmaleimide.

The hydroxylated organosilicon compounds (b) according to the invention are known compounds having the following general formula (5):

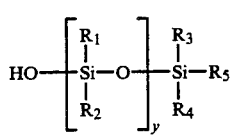

in which $R_1$, $R_2$, $R_3$, $R_4$ and $R_5$, which are identical or different, are each:

(i) a hydroxyl group or a group of the type $-OR_6$ in which $R_6$ may be a straight or branched chain alkyl radical containing from 1 to 6 carbon atoms or a phenyl radical;

(ii) a hydrogen atom;

(iii) a straight or branched chain alkyl radical containing from 1 to 6 carbon atoms and being optionally substituted by one or more chlorine or fluorine atoms or by a $-CN$ group;

(iv) a straight or branched chain alkenyl radical containing from 2 to 6 carbon atoms;

(v) a phenyl radical, optionally substituted by one or more alkyl and/or alkoxy radicals containing from 1 to 4 carbon atoms, or by one or more chlorine atoms; and y is an integer or fractional number ranging from 0 to 1,000.

For a single organosilicon compound having the formula (5), y is actually always an integer, but since compounds having a polymeric structure are envisaged by the present invention (when y is greater than 1), a single compound is seldom present, but in most cases a mixture of compounds having the same chemical structure are present, which differ in the number of repeating units in their molecule; this results in an average value of y, which may be integral or fractional.

The hydroxylated organosilicon compounds of the above-mentioned type may be characterized by the ratio of the weights of the hydroxyl groups comprising same to the total weight of their molecule.

The organosilicon compounds which are preferably employed according to the present invention are the above-mentioned compounds in which the weight ratio of the hydroxyl groups in the molecule is at least equal to 0.05% and preferably to 0.1%.

Among the organosilicon compounds of this preferred group, those which are most particularly preferred are the compounds of formula (5), in which formula:

(a) $R_1$, $R_2$, $R_3$ and $R_4$, which are identical or different, are each a straight or branched chain alkyl radical containing from 1 to 6 carbon atoms or a straight or branched chain alkenyl radical containing from 2 to 6 carbon atoms, or a phenyl radical;

(b) $R_5$ denotes a hydroxyl group; and (c) y is a number, integral or fractional, ranging from 0 to 250.

These are consequently silane-diols when y is equal to 0 or polysiloxane diols when y is other than 0.

Processes for the preparation thereof are described in W. Noll, *Chemistry and Technology of Silicones* (English translation of the 1968 German edition), published by Academic Press, New York.

The organosilicon compounds which are particularly preferred are:
(1) Diethylsilanediol,
(2) Diphenylsilanediol,
(3) Methylphenylsilanediol,
(4) 1,1,3,3-tetramethyl-1,3-disiloxanediol,
(5) 1,1-dimethyl-3,3-diphenyl-1,3-disiloxanediol,
(6) 1,3-dimethyl-1,3-diphenyl-1,3-disiloxanediol,
(7) 1,1,3,3,5,5-hexamethyl-1,5-trisiloxanediol,
(8) 1,1,3,3,5,5,7,7-octamethyl-1,7-tetrasiloxanediol,
(9) 1,1,3,3,5,5,7,7,9,9-decamethyl-1,9-pentasiloxanediol,
(10) 1,1,3,3,5,5,7,7,9,9,11,11-dodecamethyl-1,11-hexasiloxanediol, and
(11) 1,3,5,7,9-pentamethyl-1,3,5,7,9-pentaphenyl-1,9-pentasiloxanediol and their corresponding higher homologs.

The hydroxylated organosilicon compounds which are particularly suitable may also be mixtures of two or more of the above-mentioned compounds. Thus, it is possible to use, for convenience, commercial hydroxylated polysiloxane oils or resins. These are, in particular, α,ω-dihydroxylated polymethylpolysiloxane oils containing from 0.2 to 0.3% by weight of hydroxyl groups (Rhône-Poulenc oil 48 V 500), or 10 to 12% by weight of hydroxyl groups (Rhône-Poulenc 48 V 50) or α,ω-dihydroxylated methylphenyl siloxane oils or resins containing 4.5% to 5% by weight of hydroxyl groups (Rhône-Poulenc oil 50606) or from 7.5 to 8.5% by weight of hydroxyl groups (Rhône-Poulenc resin 50305); these commercial oils or resins are given by way of example, but there are others which are equally as suitable.

In the prepolymers (A) prepared from a bisimide (1) and a hydroxylated organosilicon compound (5), the quantities of reactants are selected such as to provide a weight ratio:

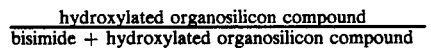

ranging from 10% to 40%.

Another manner of defining the relative proportions of bisimide and of hydroxylated organosilicon compound consists of specifying the ratio of the number of hydroxyl groups in the organosilicon compound to the number of imide groups in the bisimide. This ratio, preferably, ranges from 0.01 to 2.

The acrylic ester of the formula (4) is an acrylic or methacrylic ester which may be optionally substituted by a methyl or ethyl radical on the acrylic radical.

Diphenyldiethoxysilane dimethacrylate is preferred. This ester will be employed in a proportion of from 8 to 20% by weight relative to the total composition.

Triallyl isocyanurate will also be employed in a proportion of from 8 to 20% by weight relative to the total composition.

The imidazole compound (C) preferably has the general formula (6):

in which $R_7$, $R_8$, $R_9$ and $R_{10}$, which are identical or different, are each a hydrogen atom, an alkyl or alkoxy radical containing from 1 to 20 carbon atoms, a vinyl radical, a phenyl radical, a nitro group, with the proviso that $R_9$ and $R_{10}$, together with the carbon atoms from which they depend, may form a single ring such as, for example, a benzene ring, and with $R_7$ also being capable of denoting a carbonyl group bonded to a 2nd imidazole ring.

As specific examples of such imidazole compounds, representative are, in particular, imidazole or glyoxaline, 1-methylimidazole, 2-methylimidazole, 1,2-dimethylimidazole, 1-vinylimidazole, 1-vinyl-2-methylimidazole, benzimidazole and carbonyldiimidazole.

The imidazole compound is used in catalytic quantities. Depending upon the nature of the imidazole compound and depending upon the polymerization rate required, the imidazole compound is used in a proportion of from 0.02 to 1% by weight relative to the total composition.

Preferably, imidazole is used in a proportion of 0.05 to 0.5% by weight relative to the total composition.

The N,N',N''-tri(hydroxyalkyl)hexahydrotriazine (D) employed in the thermosetting compositions according to the invention is preferably N,N',N''-tris(hydroxyethyl)hexahydro-1,3,5-triazine, N,N',N''-tris(hydroxypropyl) or N,N',N''-tris(hydroxybutyl)hexahydro-1,3,5-triazine.

Commercially available N,N',N''-tris(hydroxyethyl)-hexahydro-1,3,5-triazine is more preferably used.

The quantity of triazine compound (D) employed in the thermosetting compositions according to the invention usually ranges from 0.2% to 2% by weight of the total composition. Preferably, a proportion of triazine compound (D) of 0.5% to 1% by weight is employed.

Lastly, in the thermosetting compositions according to the present invention the quantities of the different components are preferably such that, relative to the total weight of said components, they constitute, by weight:

(i) from 60% to 80% of bismaleimide or of a bismaleimide+monomaleimide mixture;

(ii) from 8% to 40% of an organosilicon compound of the formula (5);

(iii) from 8% to 20% of triallyl isocyanurate or of an acrylic ester having the formula (4);

(iv) from 0.02% to 1% and preferably from 0.05% to 0.5% of an imidazole compound; and (v) from 0.2 to 2% and preferably from 0.5% to 1% of a triazine compound (D).

Various adjuvants may be incorporated in the compositions according to the invention. These adjuvants, which are typically employed and are well known to this art, may be, for example, stabilizers or degradation inhibitors, lubricants or demolding agents, colorants or pigments, powdered or particulate fillers such as silicates, carbonates, kaolin, chalk, powdered quartz, mica or ballotini, etc. Adjuvants which modify the physical structure of the product obtained may also be incorporated, such as, for example, blowing agents or fibrous reinforcements: fibrils of carbon, of polyamide, of aromatic polyamides, whiskers, etc.

The manufacturing process is such that, when ready for use, the resin has sufficient flexibility and adhesiveness as a thin layer. In addition, to obtain a homogeneous material after lamination, the reactions which produce highly volatile compounds at cure temperatures must be relatively minor. To this end, when starting with a silanediol, it is desirable to first carry out the major part of the oligomerization reaction which produces water as a by-product; this water may be removed more easily during the manufacture of the resin.

Firstly, an intimate mixture of the compounds containing maleimide groups and of the hydroxylated organosilicon compound is produced. To avoid a premature homopolymerization of the maleimides, which would result in an excessively viscous resin, the mixture of maleimide and hydroxylated organosilicon compound is melted in the absence of catalyst at a temperature not exceeding the melting point of the highest melting maleimide. When starting with a hydroxyl group-rich organosilicon compound, the mixture is maintained molten in order to effect partial oligomerization of the silanediol. This compound will preferably be heated to approximately 150° C. until approximately 40% of the original hydroxyl groups have disappeared when this compound is oligomerized. Alternatively, this oligomerization can be carried out before addition of the compounds containing maleimide groups.

The imidazole compound (C) and the triazine compound (D) are added to the mixture, which is well stirred such as to enable them to disperse rapidly. When the catalyst is particularly active, it is desirable to introduce it in a solvent which is compatible with the reaction mixture, to avoid its encapsulation in the polymeric network which it produces. It has been found advantageous to employ as a diluent all or a part of the triallyl isocyanurate employed in the composition.

The mixture is degassed to remove the volatile materials which are undesirable for the preparation of laminates. Where appropriate, the acrylic ester of the biphenylated siloxane compound or triallyl isocyanurate is then again added when this compound has not been employed as a diluent. The resin is cast immediately after homogenization.

The thermosetting compositions according to the invention show increased mechanical properties in flexure relative to the compositions of the prior art.

They also have a sufficient pegosity for applications such as laminates and composite materials.

The compositions may be employed in molding or impregnation operations. They may be employed to produce coatings, glued assemblies, laminates and composite reinforced materials. The reinforcing material may be in the form of woven or non-woven sheets, unidirectional components or natural or synthetic chopped fibers such as filaments or fibers made of glass, boron, carbon, tungsten, silicon, polyamide-imides or aromatic polyamides. The compositions are of very special interest for the production of preimpregnated intermediate articles without a solvent. The impregnation of the fibrous material may be carried out by the use of conventional techniques such as immersion, blade- or curtain-coating or impregnation by transfer. The transferable film and the preimpregnated articles may be employed directly or stored with a view to subsequent use; they retain their properties remarkably well when stored cold at a temperature of from 0° to 10° C.

The impregnated materials can be employed for the production of parts having diverse shapes and functions and in many industries such as, for example, in aeronautics. These parts, which may be parts of revolution are obtained by laying several layers of prepregs on a mold or a base.

Cross-linking is then carried out under the usual technical conditions related to composite materials and, in particular, at temperatures of from 100° to 300° C.

The prepregs may also be employed as reinforcements or as means for repairing damaged parts.

However, it is also possible to design parts in accordance with supported or unsupported filament winding methods, or with injection molding or extrusion.

Shaped products with high mechanical strength and heat resistance can also be produced.

In order to further illustrate the present invention and the advantages thereof, the following specific examples are given, it being understood that same are intended only as illustrative and in nowise limitative.

EXAMPLES 1 AND 2 AND COMPARATIVE TESTS 1A AND 2A

A glass reactor, fitted with a stainless steel anchor-type stirrer and a side tube which permitted volatile products to escape was preheated in a bath at 160° C.

A powdered mixture containing:
(i) 58.8 g of N,N'-4,4'diphenylmethane bismaleimide,
(ii) 39.2 g of N,N'-4-methyl-1,3-phenylenebismaleimide, and
(iii) 42.0 g of diphenylsilanediol,
was charged therein over 4 minutes.

After 7 minutes of stirring the reaction mixture was clear.

The temperature was maintained at 150° C. for 20 minutes in order to effect partial oligomerization of the diphenylsilanediol.

The temperature was then lowered to 120° C. over 10 minutes.

The reaction mixture was then degassed to remove the water produced; this operation required 4 months, during which the pressure was gradually adjusted to approximately 65 pascals.

The following solutions were then added, according to the noted examples or comparative tests:

|  | Example 1 | Comparative Test 1A | Example 2 | Comparative Test 2A |
|---|---|---|---|---|
| Imidazole | 0.10 g | 0.10 g | 0.17 g | 0.17 g |
| N,N',N''—Tri(hydroxyethyl)-hexahydro-1,3,5-triazine (THET) | 0.99 g | 0 | 0.17 g | 0 |
| Triallyl isocyanurate (TAIC) | 24.65 g | 24.65 g | 24.65 g | 24.65 g |

The mixture was stirred for 3 minutes and then degassed for 10 minutes at 120° C. while the pressure was gradually adjusted to approximately 65 pascals.

The reaction mixture thus produced was cast in parallelepipedal molds preheated to 100° C., to produce plaques 140×100×4 mm.

The following characteristics were measured for resins prepared in this manner:

(a) pegosity and flexibility (qualitative test) as a thin film on transfer paper;

(b) dynamic viscosity at 90° C. (in pascal×second: Pa·s), (c) dynamic viscosity after 2 hours at 90° C. (in Pa·s), (d) gel time at 160° C.

The resin plaques obtained earlier were subjected to a cure under the following conditions:

(i) 1 hour at from 100° C. to 150° C. (gradual rise in temperature), (ii) 30 minutes at 150° C., (iii) 40 minutes at from 150° C. to 200° C. (gradual rise in temperature), (iv) 2 hours at 200° C., (v) 30 minutes at from 200° C. to 250° C. (gradual rise in temperature), (vi) 15 hours, 30 minutes, at 250° C., and (vii) 1 hour at from 250° C. to 100° C. (gradual cooling), and they were then demolded.

Specimens 30×7×4 mm in size were cut from the cured resin plaques and flexural strength (FS) and flexural modulus (FM) were then measured on these (the specimens were arranged on supports 25.4 mm apart) at 20° C. and 250° C.

Lastly, flexural strength (FS) and flexural modulus (FM) measurements were carried out at 20° C. and 250° C. on specimens of the same size which had been conditioned for 1000 hours at 250° C. The principal characteristics of Examples 1 and 2 and of the Comparative Tests 1A and 2A, and the results of the measurements carried out on the various resins prepared are reported in the following table.

TABLE

| Tests | Weight % of imidazole in the composition | Weight % of triazine compound in the composition | Viscosity in Pa·s at 90° C. time 0 | Viscosity in Pa·s after 20 hr at 90° C. | Gel time at 160° C. | *Adhesiveness | Resin after cure Measurement at 20° C. FS | Resin after cure Measurement at 20° C. FM | Resin after cure Measurement at 250° C. FS | Resin after cure Measurement at 250° C. FM | Resin after 1000 hr at 250° C. Measurements at 20° C. FS | Resin after 1000 hr at 250° C. Measurements at 20° C. FM | Resin after 1000 hr at 250° C. Measurements at 250° C. FS | Resin after 1000 hr at 250° C. Measurements at 250° C. FM |
|---|---|---|---|---|---|---|---|---|---|---|---|---|---|---|
| Example 1 | 0.06 | 0.6 | 1.24 | 1.7 | 47 min | ++ | 79.0 | 1900 | 44.2 | 1079 | 92.0 | 2620 | 51.8 | 1520 |
| Test 1A | 0.06 | 0 | 0.74 | 0.85 | 54 min | + | 56.0 | 1750 | 38.2 | 1100 | 51.9 | 2600 | 13.8 | 1420 |
| Example 2 | 0.10 | 0.10 | 1.65 | 2.48 | 30 min | ++ | 86.0 | 1900 | 47.0 | 1060 | 89.0 | 2430 | 46.7 | 1520 |
| Test 2A | 0.10 | 0 | 0.83 | 1.2 | 30 min | + | 74.0 | 1687 | 42.0 | 1130 | 81.0 | 2150 | 45.7 | 1430 |

*+ good adhesiveness
++ improved adhesiveness
The flexural strength (FS) and the flexural modulus (FM) are expressed in megapascals (MPa).

While the invention has been described in terms of various preferred embodiments, the skilled artisan will appreciated that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermosetting composition of matter comprising:
(A) a prepolymer prepared by interreacting, at a temperature of from about 50° C. to 300° C.:
  (a) at least one bisimide or admixture of such bisimide and monomaleimide, said at least one bisimide having the formula (1):

$$\begin{array}{c}\text{YC—CO} \qquad \text{CO—CY} \\ \| \qquad \diagdown \qquad \diagup \qquad \| \\ \qquad \text{N—L—N} \\ \| \qquad \diagup \qquad \diagdown \qquad \| \\ \text{YC—CO} \qquad \text{CO—CY} \end{array} \qquad (1)$$

wherein Y is H or CH$_3$ and L is cyclohexylene, phenylene, 4-methyl-1,3-phenylene, 2-methyl-1,3-phenylene, 5-methyl-1,3-phenylene, 2,5-diethyl-3-methyl-1,4-phenylene, or a radical of the formula (2):

(2) [structure showing two X-substituted phenyl rings connected by T]

in which T is a single valence bond or one of the radicals:

(3) $-CH_2-,\ -\underset{CH_3}{\overset{CH_3}{\underset{|}{\overset{|}{C}}}}-,\ -O-,\ -\underset{O}{\overset{O}{\underset{\|}{\overset{\|}{S}}}}-,\ H-\overset{|}{\underset{|}{C}}-\text{(phenyl)},$ -continued

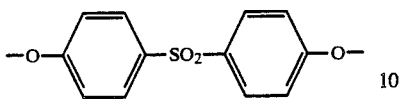

and X is hydrogen, methyl, ethyl or isopropyl; and (b) an organosilicon compound having at least one hydroxyl group bonded to a silicon atom, per molecule;

(B) triallyl isocyanurate or an acrylic ester of a diphenylated siloxane compound having the general formula (4):

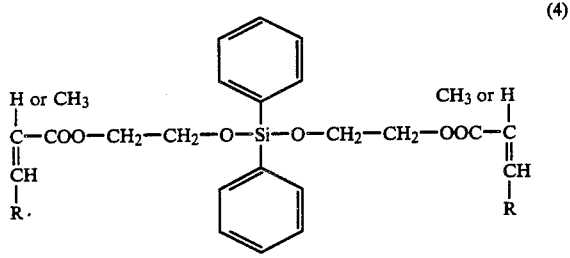

wherein R is hydrogen, methyl or ethyl;

(C) an imidazole; and (D) a N,N',N''-tris(hydroxyalkyl)hexahydrotriazine.

2. The composition of matter as defined by claim 1, wherein said at least one bisimide having the formula (1) comprises N,N'-meta-phenylene bismaleimide, N,N'-para-phenylene bismaleimide, N,N'-4,4'-diphenylmethane bismaleimide, N,N'-4,4'-diphenyl ether bismaleimide, N,N'-4,4'-diphenyl sulfone bismaleimide, N,N'-1,4-cyclohexylene bismaleimide, N,N'-4,4'-(1,1-diphenylcyclohexylidene)bismaleimide, N,N'-4,4'-(2,2-diphenylpropane)bismaleimide, N,N'-4,4'-triphenylmethane bismaleimide, or N,N'-6-methyl-1,3-phenylene bismaleimide.

3. The composition of matter as defined by claim 1, said organosilicon compound (b) having the general formula (5):

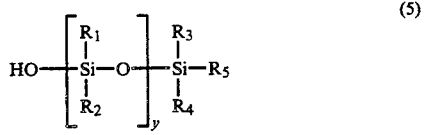

in which $R_1$, $R_2$, $R_3$, $R_4$ and $R_5$, which are identical or different, are each hydroxyl or —$OR_6$ in which $R_6$ is a straight or branched chain alkyl radical containing from 1 to 6 carbon atoms or a phenyl radical; hydrogen; a straight or branched chain alkyl radical containing from 1 to 6 carbon atoms or such radical optionally substituted by one or more chlorine or fluorine atoms or by —CN; straight or branched chain alkenyl radical containing from 2 to 6 carbon atoms; or a phenyl radical optionally substituted by one or more alkyl and/or alkoxy radicals containing from 1 to 4 carbon atoms, or by one or more chlorine atoms; and y is an integral or fractional number ranging from 0 to 1000.

4. The composition of matter as defined by claim 3, wherein said imidazole (C) has the formula (6):

in which $R_7$, $R_8$, $R_9$ and $R_{10}$, which are identical or different, are each a hydrogen atom, an alkyl or alkoxy radical containing from 1 to 20 carbon atoms, a vinyl radical, a phenyl radical, a nitro group, with the proviso that $R_9$ and $R_{10}$, together with the carbon atoms from which they depend, may form a single ring structure, and further wherein $R_7$ may be a carbonyl group bonded to a second imidazole ring.

5. The composition of matter as defined by claim 4, wherein said N,N',N''-tris(hydroxyalkyl)hexahydrotriazine (D) is N,N',N''-tris(hydroxyethyl)hexahydro-1,3,5-triazine, N,N',N''-tris(hydroxypropyl)hexahydro-1,3,5-triazine, or N,N',N''-tris(hydroxybutyl)hexahydro-1,3,5-triazine.

6. The composition of matter as defined by claim 5, wherein said at least one bisimide (a) is N,N'-diphenylmethane bismaleimide, N,N'-1,3-methyl-4-phenylenebismaleimide, N,N'-1,3-methyl-2-phenylenebismaleimide, or admixture thereof.

7. The composition of matter as defined by claim 6, wherein said organosilicon compound (b) is diphenylsilanediol.

8. The composition of matter as defined by claim 5, wherein said imidazole (C) is imidazole, 1-methylimidazole, 2-methylimidazole, 1,2-dimethylimidazole, 1-vinylimidazole, 1-vinyl-2-methylimidazole, benzimidazole or carbonyldiimidazole.

9. The composition of matter as defined by claim 3, comprising, by weight relative to the total weight thereof:

(i) from 60% to 80% of the at least one bisimide (a);
(ii) from 8% to 40% of the organosilicon compound having the formula (5);
(iii) from 8% to 20% of triallyl isocyanurate or acrylic ester of formula (4);
(iv) from 0.02% to 1% of the imidazole (C); and
(v) from 0.2 to 2% of the triazine compound (D).

10. A process for the preparation of the composition of matter as defined by claim 1, comprising formulating an intimate admixture of the imido compounds and the hydroxylated organosilicon compound, melting said admixture at a temperature not exceeding the melting point of the highest-melting imide, adding thereto the imidazole and the triazine compound, dissolved in a diluent, degassing the resulting mixture, and then adding the triallyl isocyanurate or the acrylic ester of a diphenylated siloxane compound thereto.

11. The process as defined by claim 10, comprising, prior to mixing of the imide compounds and the hydroxylated organosilicon compound, heating the latter until at least 40% of the original hydroxyl groups have disappeared.

12. The process as defined by claim 10, wherein the imidazole and the triazine compound are dissolved in triallyl isocyanurate.

13. The composition of matter as defined by claim 1, in thermoset state.

14. A shaped article comprising a substrate coated with the composition of matter as defined by claim 1.

15. A shaped article comprising a substrate coated with the composition of matter as defined by claim 13.

16. A shaped article comprising the composition of matter as defined by claim 1.

17. A shaped article comprising the composition of matter as defined by claim 13.

18. The shaped article as defined by claim 14, comprising a laminate or composite.

19. The shaped article as defined by claim 15, comprising a laminate or composite.

* * * * *